Sept. 29, 1936.  M. DADSWELL  2,055,717

SUSPENSION MEANS FOR BOAT BERTHS

Filed April 18, 1936  2 Sheets-Sheet 1

INVENTOR.
MERCY DADSWELL
BY Edward M. Apple
ATTORNEY.

Sept. 29, 1936.   M. DADSWELL   2,055,717
SUSPENSION MEANS FOR BOAT BERTHS
Filed April 18, 1936   2 Sheets-Sheet 2

INVENTOR.
MERCY DADSWELL
BY Edward M. Apple
ATTORNEY.

Patented Sept. 29, 1936

2,055,717

UNITED STATES PATENT OFFICE 2,055,717

SUSPENSION MEANS FOR BOAT BERTHS

Mercy Dadswell, Detroit, Mich.

Application April 18, 1936, Serial No. 75,095

5 Claims. (Cl. 114—193)

This invention relates to beds, and more particularly to a suspension means for beds in boats, ambulances, air craft and the like.

The invention has for its principal object the provision of means whereby a bed may be suspended from above and cushioned against the swaying and rolling motions present in boats or other moving vehicles.

Another object of the invention is the provision of a suspension means for beds having suitable adjustments which may be varied according to the particular conditions encountered. For instance, the tension of the coupling between the bed and the supporting structure may be varied to best adapt the bed to varying degrees of instability of the supporting structure. In this manner the occupant of the bed is assured of the maximum amount of comfort under any and all conditions.

An advantageous feature of the invention resides in the fact that with its use, the discomfort found in overnight travel on boats, trains, aeroplanes and the like, may to a great extent be obviated. Heretofore travelers have had to endure restless and sleepless nights and the inevitable poor health and personal inefficiency resulting therefrom. With my invention this is largely eliminated. The vibration and swaying motions of the vehicle or vessel are effectively damped and the sleeper may rest in comparative comfort.

A further object of the present invention is the provision of a suspension means of the character referred to, which is sturdy, though simple in construction; one inexpensive to manufacture and assemble; and one which occupies a minimum of space.

Other objects and advantages of the invention will appear as the description proceeds.

The invention resides in the improved construction of the bed and its cooperating coupling, and in the combination and arrangement of parts, the novelty of which will be particularly pointed out and distinctly claimed hereinafter.

In order to understand the invention more readily, it is believed desirable to first describe one construction of a device embodying the invention and to this end reference should be made to the accompanying drawings, in which.

Figure 1:
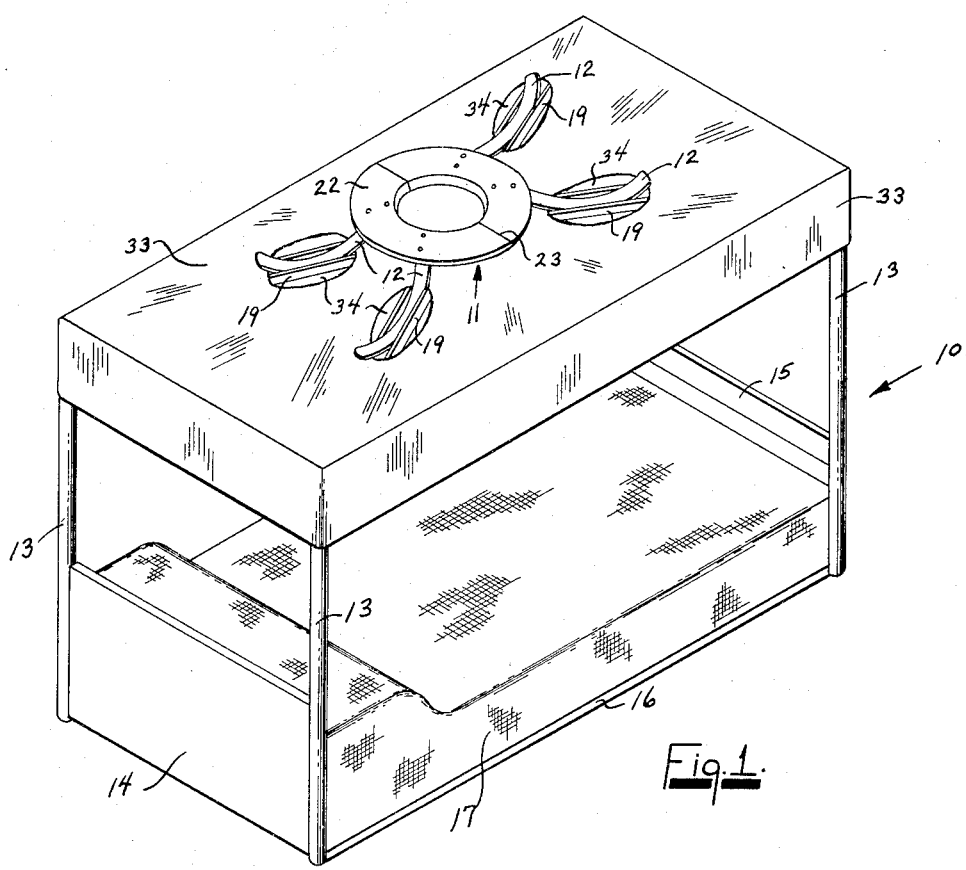
Fig. 1 is a perspective view of a device embodying the invention.
Figure 2:
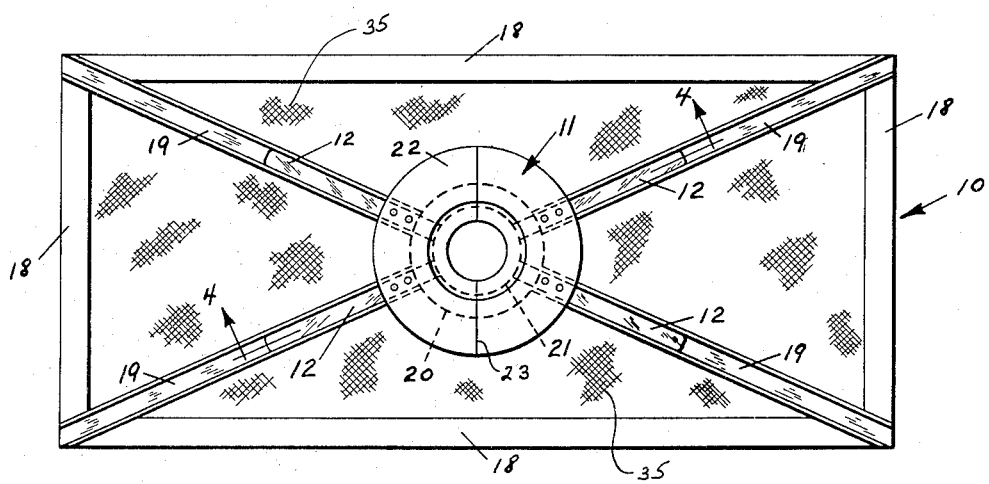
Fig. 2 is a plan view thereof, with the canopy removed.
Figure 3:
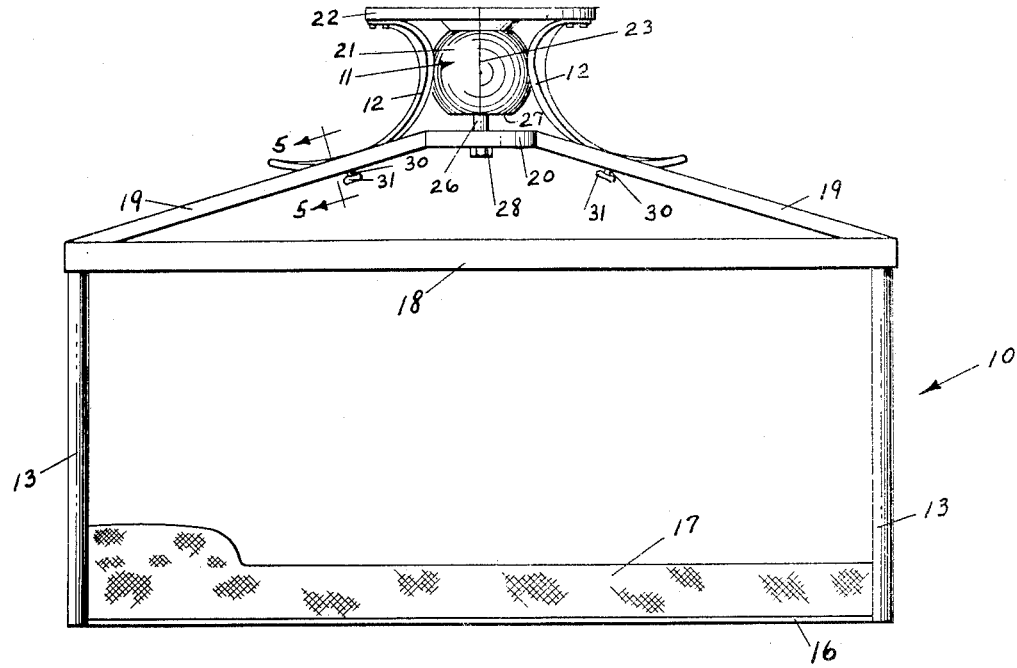
Fig. 3 is a side elevational view of the device, also with the canopy removed.

Upon reference to the drawings, it will be noted that in the embodiment herein disclosed, my invention comprises a conventional four poster bed, indicated generally by the reference character 10, a coupling 11 of the ball and socket variety, and a plurality of resilient spring members 12.

The bed 10 is supported by the four corner pillars 13 which may be of any desired shape and construction. For example, they might be L shaped angle bars, rectangular bars, or square ones; but for the sake of simplicity, strength and appearance I have illustrated herein pillars of tubular construction, preferably made of steel. The bed consists of the head piece 14, the foot piece 15, and the base 16 upon which is supported suitable springs and mattress (not shown) and the bedding 17. The upper extremities of the pillars 13 are braced by the cross members 18, which are preferably made of L shaped angle bars.

Extending inwardly and upwardly from the four upper corners of the bed 10 are U shaped channel members 19, which are joined together by the circular disc 20. The aforesaid channel members 19 may be bolted, riveted, welded or otherwise suitably secured to the four corners of the bed. Likewise they may be fastened to the disc 20 by any convenient means, but in this instance I prefer to weld them, for the purpose of strength and economy.

The bed assembly hereinabove described depends from the ceiling of the vehicle or boat stateroom by means of the coupling 11. I prefer to construct the coupling 11 in the form of a ball and socket arrangement, but it is not beyond the contemplation of the invention to employ any other suitable type of universal acting coupling. The socket of the coupling 11 comprises a hollow spherical member 21 and a horizontally disposed flange 22, which is preferably formed integrally with the member 21. The above mentioned flange 22 is adapted to be bolted or otherwise fixedly secured to the ceiling or supporting structure of the stateroom or berth. The spherical portion 21 is formed in two pieces, being split as at 23 to enable the ball to be readily insertable therein.

Figure 4:
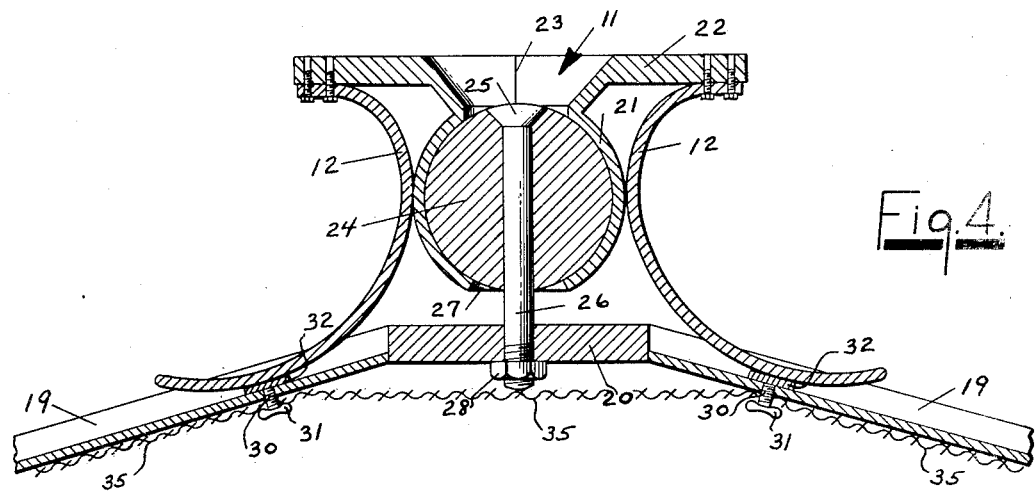
Fig. 4 is a vertical sectional view taken substantially on the plane indicated by the lines 4—4 of Fig. 2.
Figure 5:
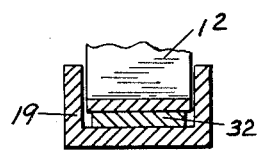
Fig. 5 is a sectional view taken substantially on the plane indicated by the lines 5—5 of Fig. 3.

Arranged to frictionally engage the inner surface of the hollow spherical portion 21 of the socket is the ball 24 (Fig. 4). Both the outer surface of the ball 24 and the inner surface of the socket are formed with smooth cooperating bearing surfaces for free relative movement therebetween. The ball 24 has an axial hole extending therethrough, said hole being formed with an enlarged cone shaped opening at its upper extremity for the purpose of engaging the similarly shaped head 25 of the supporting rod 26 extending through the ball. To permit unobstructed movement of the rod 26, I have formed the aforementioned socket 21 with an enlarged opening 27 in the bottom thereof. The lower end of the rod 26 passes through a centrally positioned hole in the disc 20 and is fastened to said disc by any suitable means. In the illustrated embodiment this fastening means comprises a nut 28 adapted to be threaded upon the end of the rod 26, but the union could also be successfully made by welding or by shrinking the parts together.

From the above description it will be apparent that the bed 10 is effectively secured from any motion of the boat, aeroplane or vehicle. The socket 21 of the device will move as a unit with the motion of the supporting structure, but the bed 10 will tend to remain on an even keel due to the relative movement occuring between the ball 24 and the socket 21. A further examination of the device, however, discloses the fact that a damping effect must be employed to render the bed stable and to prevent any tendency of the bed to oscillate or set up a counter motion to the motion of the boat. A preferred form of damping regulator is shown in the drawings, and is hereinafter described.

Fixedly secured to the horizontally extending flange 22 of the socket are the flat resilient springs 12. The springs are bent downwardly and outwardly in such manner that their central portions contact the spherical socket 21 and their lower portions rest in the channels formed by the U shaped members 19. In this instance four springs are utilized, one in each channel member. The springs 12 are installed in place while under a predetermined amount of compression, and being in related contact between the socket 21 and the channel members 19, it is obvious that a damping effect is secured. Furthermore, the engagement of the springs 12 in the channels 19 resist any tendency of the bed to rotate or turn about the vertical axis.

In order to permit the occupant of the bed to adjust the amount of compression in the springs 12 to secure the maximum comfort under any particular condition, I provide means for increasing or decreasing the degree of bend in said springs, as illustrated in Fig. 4. This means comprises a bolt 30 which extends upwardly through the bottom of the channel 19. The lower end of the bolt is formed with the wingshaped head 31 to facilitate turning thereof, and a flat washer 32 is fastened to the upper end of said bolt. The bolt is positioned in the channel 19 directly beneath the point of contact of the spring 12, so that the spring rests upon the top of the washer 32. It is readily seen that the washer may be raised or lowered by means of the wing-headed bolt to secure any desired amount of compression in the spring 12.

For cleanliness and appearance, the upper portion of the bed is covered by means of a canopy 33, made of any suitable fabric. The canopy extends over the channels 19 and is formed with suitably located openings 34 to enable the springs 12 to operate in said channels. In addition, I provide an inner covering 35 (Fig. 4) which covers the working parts from the view of the occupant. Small holes are located in this covering to permit the heads 31 of the bolts 30 to extend therethrough, for easy adjustment.

Although I have herein disclosed a certain embodiment of my invention, it will be understood that various modifications may be employed, without violating the spirit of the invention, all of which are intended to be within the scope of the appended claims.

Having described my invention, what I claim and desire to secure by Letters Patent is:

1. Suspension means for a bed comprising the combination of a split annular member having depending semi-spherical portions, a ball freely mounted in said last named portions, means secured to said ball for supporting a bed, said means comprising an axial member secured to said ball, transverse channel members secured to said last named member and to the frame of a bed, and resilient means extending between said annular member and said channel members.

2. Suspension means for a bed comprising the combination of a split annular member having depending semi-spherical portions, a ball freely mounted in said last named portions, means secured to said ball for supporting a bed, said means comprising an axial member secured to said ball, transverse channel members secured to said last named member and to the frame of a bed, resilient means extending between said annular member and said channel members, and adjustable means for varying the tension on said resilient means.

3. In a bed suspension device including a ball and socket joint, the combination of a plurality of channel members secured to said ball and arranged to support a bed, and arcuate flat springs secured at one end to said socket, the free ends of said springs being arranged to slidably engage said channel members.

4. In a bed suspension device including a ball and socket joint, the combination of a plurality of channel members secured to said ball and arranged to support a bed, arcuate flat springs secured at one end to said socket, the free ends of said springs being arranged to slidably engage said channel members, and adjustable means carried by said channel members for varying the tension on said springs.

5. In a bed suspension device including a ball and socket joint, the combination of a plurality of transversely extending channel members secured to said ball, and arcuate flat springs secured at one end to said socket, the free ends of said springs being arranged to slidably engage said channel members and prevent axial movement of said ball.

MERCY DADSWELL.